United States Patent
Huang

(10) Patent No.: US 8,252,436 B1
(45) Date of Patent: Aug. 28, 2012

(54) TOUCH SCREEN WITH ANTI-REFLECTION, FINGERPRINT-RESISTANT COATING

(75) Inventor: Chao-Jui Huang, New Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/172,839

(22) Filed: Jun. 30, 2011

(30) Foreign Application Priority Data

Apr. 27, 2011 (TW) .............................. 100114688 A

(51) Int. Cl.
*B32B 17/06* (2006.01)
*B32B 15/04* (2006.01)

(52) U.S. Cl. ........ 428/701; 428/426; 428/702; 977/774; 977/775; 977/776

(58) Field of Classification Search .................. 428/426, 428/701, 702; 977/774, 775, 776
See application file for complete search history.

(56) References Cited

U.S. PATENT DOCUMENTS

| | | | |
|---|---|---|---|
| 4,806,514 A * | 2/1989 | Langford et al. ............. 502/159 |
| 5,876,854 A * | 3/1999 | Kawazu et al. ............... 428/428 |
| 5,942,331 A * | 8/1999 | Miyauchi et al. ............. 428/428 |
| 5,961,843 A * | 10/1999 | Hayakawa et al. ....... 210/748.12 |
| 5,997,958 A * | 12/1999 | Sato et al. .................... 427/468 |
| 6,004,667 A * | 12/1999 | Sakurada et al. ............. 428/323 |
| 6,027,797 A * | 2/2000 | Watanabe et al. .......... 428/312.8 |
| 6,242,752 B1 * | 6/2001 | Soma et al. ................ 250/504 R |
| 6,277,346 B1 * | 8/2001 | Murasawa et al. ......... 423/239.2 |
| 6,399,229 B1 * | 6/2002 | Takeda et al. ................. 428/701 |
| 6,855,396 B1 * | 2/2005 | Mennig et al. ................ 428/144 |
| 7,597,930 B2 * | 10/2009 | Boire et al. ................... 427/166 |
| 7,625,835 B2 * | 12/2009 | Li et al. ......................... 502/216 |
| 7,985,607 B2 * | 7/2011 | Kim et al. ....................... 438/29 |
| 2004/0095660 A1 * | 5/2004 | Kobayashi et al. ........... 359/883 |
| 2004/0115416 A1 * | 6/2004 | Nonninger et al. ........ 428/304.4 |
| 2005/0049158 A1 * | 3/2005 | Cai ................................ 510/197 |
| 2006/0083694 A1 * | 4/2006 | Kodas et al. .................... 424/46 |
| 2007/0077522 A1 * | 4/2007 | Satoh et al. .............. 430/270.11 |
| 2007/0149654 A1 * | 6/2007 | Cheng et al. .................. 523/336 |
| 2008/0123078 A1 * | 5/2008 | Saraf ............................... 356/32 |
| 2009/0114273 A1 * | 5/2009 | Kamat .......................... 136/252 |
| 2010/0043872 A1 * | 2/2010 | Richter et al. ................ 136/255 |
| 2010/0294344 A1 * | 11/2010 | Huang .......................... 136/251 |
| 2011/0245378 A1 * | 10/2011 | Russ et al. .................... 523/440 |
| 2012/0125781 A1 * | 5/2012 | Zhang et al. .................. 205/340 |

FOREIGN PATENT DOCUMENTS

CN 1792445 * 6/2006

OTHER PUBLICATIONS

CN 1792445 abstract translation.*

* cited by examiner

*Primary Examiner* — Jennifer McNeil
*Assistant Examiner* — Lauren Robinson
(74) *Attorney, Agent, or Firm* — Altis Law Group, Inc.

(57) ABSTRACT

A touch screen includes a substrate, and a coating attached to the substrate. The coating includes titanium dioxide and cadmium selenide in a relative weight ratio of about 3:1. The particle size of the titanium dioxide is about 2 nanometers. The particle size of the cadmium selenide ranges from about 2.3 to about 3.7 nanometers.

4 Claims, No Drawings

TOUCH SCREEN WITH ANTI-REFLECTION, FINGERPRINT-RESISTANT COATING

BACKGROUND

1. Technical Field

The present disclosure relates to touch screens.

2. Description of Related Art

Touch screens are widely used in electronic devices, such as smart phones and tablet computers. These touch screens are easily stained with fingerprints when touched. As well, images and text displayed with a touch screen are hard to see when the electronic device is used in intense sunshine or lamplight, due to reflection of light from the touch screen.

Titanium dioxide ($TiO_2$) is a well-known material with photocatalytic properties. Therefore, coatings comprised of titanium dioxide are applied onto various glass and ceramic instruments and products for the purpose of self-cleaning. However, the photocatalytic reaction of titanium dioxide is far more active with irradiation by ultraviolet light than with irradiation by visible light. That is, coatings comprised of titanium dioxide can only absorb limit amounts of visible light, and therefore the anti-reflection properties of such coatings are typically unsatisfactory.

DETAILED DESCRIPTION

The present disclosure provides examples by way of illustration of the inventive principles herein and not by way of limitation. It should be noted that references to "an" or "one" embodiment in this disclosure are not necessarily to the same embodiment, and such references can mean at least one.

An exemplary embodiment of a touch screen includes a substrate. A conductive film is attached to an inner side of the substrate, and a coating is attached to an outer side of the substrate which faces users of the touch screen. The coating can have a thickness in the range of, for example, 10 to 100 nanometers. The coating contains titanium dioxide ($TiO_2$) and cadmium selenide (CdSe) in a weight ratio of about 3:1. The $TiO_2$ in the coating is anatase, with a particle size of about 2 nanometers. The particle size of the CdSe in the coating is in a range from about 2.3 to about 3.7 nanometers. In one embodiment, the CdSe in the coating is composed of particles with particle sizes of about 2.3 nanometers and with a weight ratio of about 25% in the CdSe, particles with particle sizes of about 2.6 nanometers and with a weight ratio of about 15% in the CdSe, particles with particle sizes of about 3.0 nanometers and with a weight ratio of about 45%, and particles with particle sizes of about 3.7 nanometers and with a weight ratio of about 15%. In one embodiment, the substrate is made of glass.

To apply the coating to the substrate, a $TiO_2$ powder with particle size of about 2 nanometers and a CdSe powder with particle size ranging from about 2.3 nanometers to about 3.7 nanometers is mixed with a weight ratio of about 3:1. Deionized water is added to the mixed powder to produce a paste. The paste is sprayed onto the substrate. The substrate with the paste is baked to form the CdSe—$TiO_2$ coating on the substrate.

The CdSe particles in the coating function as quantum dots. According to the size quantization effect, the wavelengths of light to be absorbed by the coating are variable with the different sized CdSe particles. It has been proven that the coating can absorb visible light when the sizes of the CdSe particles are in a range from about 2.3 nanometers to about 3.7 nanometers. At the same time, because of the photocatalytic property of the $TiO_2$ particles in the coating, the coating can self-clean fingerprints that are left on the screen.

It is to be understood, however, that even though numerous characteristics and advantages of the embodiments have been set forth in the foregoing description, together with details of the structures and functions of the embodiments, the present disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A touch screen, comprising:
   a substrate; and
   a coating attached to a side of the substrate, and containing titanium dioxide and cadmium selenide in a weight ratio of about 3:1, wherein a particle size of the titanium dioxide in the coating is about 2 nanometers, and a particle size of the cadmium selenide in the coating is in the range from about 2.3 nanometers to about 3.7 nanometers.

2. The touch screen of claim 1, wherein the titanium dioxide in the coating is anatase.

3. The touch screen of claim 1, wherein the cadmium selenide in the coating is composed of particles with particles sizes of about 2.3 nanometers in a weight ratio of about 25%, about 2.6 nanometers in a weight ratio of about 15%, about 3.0 nanometers in a weight ratio of about 45%, and about 3.7 nanometers in a weight ratio of about 15%.

4. The touch screen of claim 1, wherein the substrate is made of glass.

* * * * *